United States Patent [19]
Voss et al.

[11] Patent Number: 5,988,741
[45] Date of Patent: Nov. 23, 1999

[54] BICYCLE SEAT POST FLARE POST

[76] Inventors: Darrell W. Voss, 687 Coal Creek Rd.; Gary G. Klein, 675 NW. St. Helen St., both of Chehalis, Wash. 98532

[21] Appl. No.: 08/423,510

[22] Filed: Apr. 17, 1995

[51] Int. Cl.$^6$ .................................................. B62J 1/00
[52] U.S. Cl. ............................. 297/215.15; 297/215.14
[58] Field of Search ........................... 297/195.1, 215.13, 297/215.14, 215.15; 403/84, 90, 91, 87

[56] References Cited

U.S. PATENT DOCUMENTS

| | | | |
|---|---|---|---|
| 3,992,054 | 11/1976 | Campagnolo | 297/215.15 |
| 4,568,121 | 2/1986 | Kashima | 297/215.15 |
| 5,338,100 | 8/1994 | Rees | 297/452.1 |

*Primary Examiner*—Milton Nelson, Jr.
*Attorney, Agent, or Firm*—Jim Zegeer

[57] ABSTRACT

A lightweight, high strength bicycle seat post for securing a bicycle seat to a seat tube of a bicycle frame. It comprises a hollow metal tubular member having a seat tube portion for reception in and securement to the seat tube of a bicycle frame, and an integral head portion comprised of four planar walls diverging in an upward direction to form an open space. A pair of the sidewalls are oriented in a fore and aft direction to the fore and aft direction of the bicycle seat and a pair of end walls which are transverse to the fore and aft direction and connects the fore and aft ends of the pair of sidewalls together defining the open space, which, preferably, is generally rectangular. The upper edges of the sidewalls have arcuate load reacting edges, which define a seat angle adjustment path, and a clamp assembly secures the bicycle seat to the load reacting edges so that the seat loads are transferred directly to the load reacting edges at any seat angle. In a preferred embodiment, the integral head portion is formed by a metal swaging process from an extruded metal tube and the metal tube is selected from steel, aluminum, or titanium alloy. The arcuate load reacting edges of the sidewalls can include a lip which is normal to the load reacting edges, and the clamp parts include washer members which have arcuate grooves for receiving the lip.

4 Claims, 5 Drawing Sheets

BICYCLE SEAT POST FLARE POST

FIELD OF INVENTION

This invention relates to human-powered cycles, specifically to an improved seat post for securing the seat to the frame.

PRIOR ART

FIG. 1:

Kurke and Kurke U.S. Pat. No. 5,244,301 Sep. 14, 1993

Chen U.S. Pat. No. 4,987,764 Jan. 29, 1991

A seat post (or pillar) is a bicycle component which secures the seat (or saddle) to the frame. It allows up and down adjustment of seat height to fit the unique leg length of an individual rider. The seat post also allows adjustment of the angle (or pitch) of the seat to suit the individual. Seat posts generally consist of a tube with a head on top. The underside of the seat typically has two longitudinal tubular rails which the head clamp grips. FIG. 6 of U.S. Pat. No. 4,987,764 shows this detail clearly. The head is generally a casting or forging which is relatively heavy (accounting for 58% of the total weight of the seat post in one typical design). U.S. Pat. No. 4,987,764 to Chen is an example of this type of construction. Attachment of the seat post to the bicycle frame is achieved by inserting the lower tubular portion of the seat post into the upper, open end of the frame seat tube and tightening a binder bolt in the seat tube clamp assembly.

Racing bicycles generally use seat posts which have been optimized for light weight through the use of low density, strong materials such as aluminum, titanium or composites of carbon fiber and polymeric resin. Bicycle racers have always sought to minimize the weight of their bicycles. A light bicycle is easier to pedal up hills, easier to control and has a better "feel" than a heavy bicycle. A light bicycle enables higher speed in competition. U.S. Pat. No. 5,244,301 to Kurke and Kurke discloses a seat post design intended to reduce weight. In Kurke's design, an arcuate clamping surface is welded directly to the top of a tube, reducing the mass of metal otherwise used in a casting or forging. However, the Kurke design requires welding, a hand process which is prone to variation.

Metallic mountain bike racing seat posts in a 350 mm length, measured from the saddle rails to the lower end of the post, weigh between 224 grams and 340 grams. Following is a list of some examples, with strength ratings:

| Identification | Ultimate Load (Pounds) | Weight (g) | O.E.M. Cost US $ | Strength/ (mass* cost^.5) |
| --- | --- | --- | --- | --- |
| Shimano Deore XT (steel) | 837 | 336 | | |
| Shimano XTR (steel) | 789 | 274 | | |
| IRD 370 mm | | 299 | | |
| Ritchey (Nitto) 330 mm | | 286 | | |
| American Classic 300 mm | | 306 | | |
| Kalloy Alum. | 514 to 683 | 268 | $9 | .64–.85 |
| Kore 6061 Alum. | 430 | 225 | | |
| Syncros 6061 Alum. | 472 | 242 | $26 | .38 |
| Syncros 7075 Alum. | 807 | 224 | $38 | .58 |
| Korean Alum. | 828 | | n.a. | |
| Italmanubri Alum. | 603 | 333 | $6 | .74 |
| Italmanubri Steel | 529 | 271 | | |
| Control Tech Alum. | 741 | 291 | $19 | .58 |
| NON-METALLIC German composite | 480 | 185 | $160 | .21 |

| Identification | Ultimate Load (Pounds) | Weight (g) | O.E.M. Cost US $ | Strength/ (mass* cost^.5) |
| --- | --- | --- | --- | --- |
| INVENTION | | | | |
| Flare Post 6061 Alum | 600 | 220 | $5 | 1.22 |
| Flare Post 7075 Alum | 750 | 180 | $15 | 1.08 |

The strength rating in pounds refers to the ultimate load carried by the seat post when tested in a cantilever bending fixture with load applied to the head of the post. Load was applied at an angle of 135 degrees to the axis of the post, and the length of the cantilever was 226 mm. Failure occurs by yielding of the metal at the base of the post (at the base of the cantilever beam), where it is inserted into the hole in the holding fixture. It can be shown that seat posts which yield at loads less than 750 lbs in the cantilever bending test tend to bend during typical enthusiastic off road mountain bike riding. Many of the lightweight aluminum designs shown in the table above are insufficient in strength for enthusiastic off road use.

The same type of post designs are also used for road riding, but in the road case are not as long, and are not typically adjusted as high out of the frame, and do not receive the same level of shock loads. Thus, the bending strength for road type seat posts does not need to be quite as high and the extension will also be lower, allowing an even lighter weight post.

The OEM costs are currently quoted and may change over time. The market values light weight bicycles in a non linear relationship, and thus the strength is divided by the mass in grams times the square root of the price in U.S. dollars. For most posts, the strength can be increased or decreased by changing the mass of material in the strength critical areas, in a generally linear relationship. So the Strength divided by the mass gives an indication of the structural efficiency of a design. The strength may also be improved by using more expensive higher strength materials or processing. This increases the selling price. The price relationship is not linear so the square root of price is used. Very inexpensive posts achieve a high rating by this formula, as the price dominates the strength and weight. Of course the lower price posts successfully dominate the high volume portion of the market. The invention achieves a much higher combined value of price—performance, (price, strength and weight) than prior art designs, for both inexpensive and higher quality designs.

A prior art design for a carbon/epoxy composite seat post has some new and unique features, as shown in FIG. 1. A tube 1 flared out into a head 2 as a continuous, laminated structure. Head 2 had a closed upper surface 3 which mated to a pillow washer 4, which was secured by a bolt 5 and a yoke 6. The seat post of this design retained saddle seat rails 6a between yoke 6 and pillow washer 4. An internal cam 7 tightened bolt 5 onto yoke 6. This design was very light—about 185 grams. This weight savings came from the use of light weight thin wall Carbon fiber composite materials and the replacement of the typical heavy head forging with a lightweight hollow structure. However, this design suffered from several drawbacks:

1. The pinching action of the typical seat post clamp crushes the composite inward and delaminates it, resulting in a weakened section under cantilever compression loading.

2. The mounting hole location for cam 7 induces bearing stress on the composite. Epoxy Carbon composites, while very strong in the direction of the fibers, are very weak in shear and in bearing stress. Bending stresses from off-center loading of the seat can combine with these bearing stresses to result in compressive failure in head 2 or bearing failure at the cam-to-head joint.

3. Tube 1 was prone to local buckling failure at the edge of the seat tube. This was the mode of failure seen in the test documented above.

4. The composite surface of tube 1 becomes self-lubricating after it wears in abrasion with the frame seat tube and grit. This means that the seat tube clamp must be tightened excessively to prevent motion of the seat post, inducing more pinching stress on tube 1.

5. The angle between tube 1 and head 2 is not similar enough to other seat post designs to allow the installed seat position to be standard. The clamp on standard seat post designs are offset to the rear. Some newer posts being used are centered on the seat post. The German Carbon post forces the clamp to be ahead of center due to the seat tube angle. Use of this style of seat post results in the rider being pushed forward about 20 mm. This may be useable for a few special fitting cases, but is undesirable in general.

6. The top surface of head 2 and the lower surface of pillow washer 4 are grooved or serrated to lock in seat pitch adjustments. This prevents the mechanism from being infinitely adjustable.

7. The composite design is relatively expensive to produce, requiring matched heated molds and a cycle time of about an hour.

8. Adjustment of tension in bolt 5 and cam 7 is not simple—it requires repeated loosening and tightening of cam 7 and bolt 5 until the correct adjustment is achieved.

9. The 185 gram design is weak, as shown in the test results above.

10. The fibers used to form tube 1 are braided and run at about a 30 degree angle from the axis of tube 1. As a result, the stiffness of the tube is somewhat lower than that of an equivalent steel, Titanium or Aluminum tube. This lower stiffness causes the tube to flex more than a metallic tube, and this flexing action may cause fatigue failure in the top portion of the seat tube in the bicycle frame. It is better for the seat post to be rigid in the top portion of the bicycle frame, as this helps to disperse the bending loads in the frame.

In summary, past bicycle seat post designs suffer from some or all of the following disadvantages:

1. Some are too weak for enthusiastic mountain bike riding and bend or fail in use.

2. If they are strong enough, they usually weigh over 250 grams.

3. If they are strong enough, and weigh less than 250 grams, they are relatively expensive to produce. The Syncros 7075 design, for instance, requires a considerable amount of lathe turning and CNC milling, as well as using expensive starting materials.

4. They have a number of parts:
 a. Tubular column
 b. seat post head, or fastener support
 c. rail support(s)
 d. rail clamp(s)
 e. one or more fasteners and washers 5. The down forces through the saddle rails and/or the clamping forces are typically directed through cantilevered structures and clamps, increasing the necessary weight of the assembly. They are not typically taken directly by the tube wall.

6. It is difficult on some designs to obtain a secure clamping of the saddle position. They will slip or loosen in use.

7. Many of the existing post designs support the rails over a very short distance, resulting in easily bent or damaged rails, due to the high leverage forces created. Many of the high quality saddle rails are tubular alloy steel, and a poorly designed clamp can damage the tubular structure.

OBJECTS AND ADVANTAGES

Accordingly, several objects and advantages of the current bicycle seat post are:

1. To provide a seat post which weighs less than other seat posts at a similar manufacturing cost.

2. Less than 250 grams for an inexpensive, less than $10 OEM price post.

3. Less than 200 grams for a medium price, less than $20 OEM priced post.

4. To provide a seat post with adequate strength level for the appropriate series of post, above 500 lbs for an economical post and 700 lb for a high quality, medium price post, when tested as described above.

5. To provide a seat post which is easily and inexpensively manufactured.

6. To provide a seat post which has one less component than typical, namely the seat post head.

7. To provide a seat post with convenient adjustment means.

8. To provide a seat post with secure clamping means.

9. To provide a seat post which adequately supports the saddle rails, and does not damage them, with a spacing fore and aft of at least an inch, but preferably 1.25 to 1.5 inches and a suitable saddle rail clamping means which distributes the stress to the rails adequately.

BRIEF DESCRIPTION OF THE INVENTION

According to the invention, the improved seat post assembly of the present invention is comprised of a metal tube, which has a circular seat post portion and an integral inverted truncated open base pyramid having a pair of edges, preferably defining continuous adjustment range, and receiving all of the loading from a pair of spaced seat rails. Preferably, the inverted truncated pyramid head is formed by a spinning, rotary swaging or flaring process, or a combination of these processes. The seat rails rest directly on the pair of preferably smooth arcuate edges. A variety of rail clamps or attachment techniques is disclosed.

DESCRIPTION OF THE DRAWINGS

Further objects, advantages and features of the invention will become apparent when considered with the following description and drawings, wherein.

DESCRIPTION OF THE INVENTION

A. Embodiment 1

Figure 1:
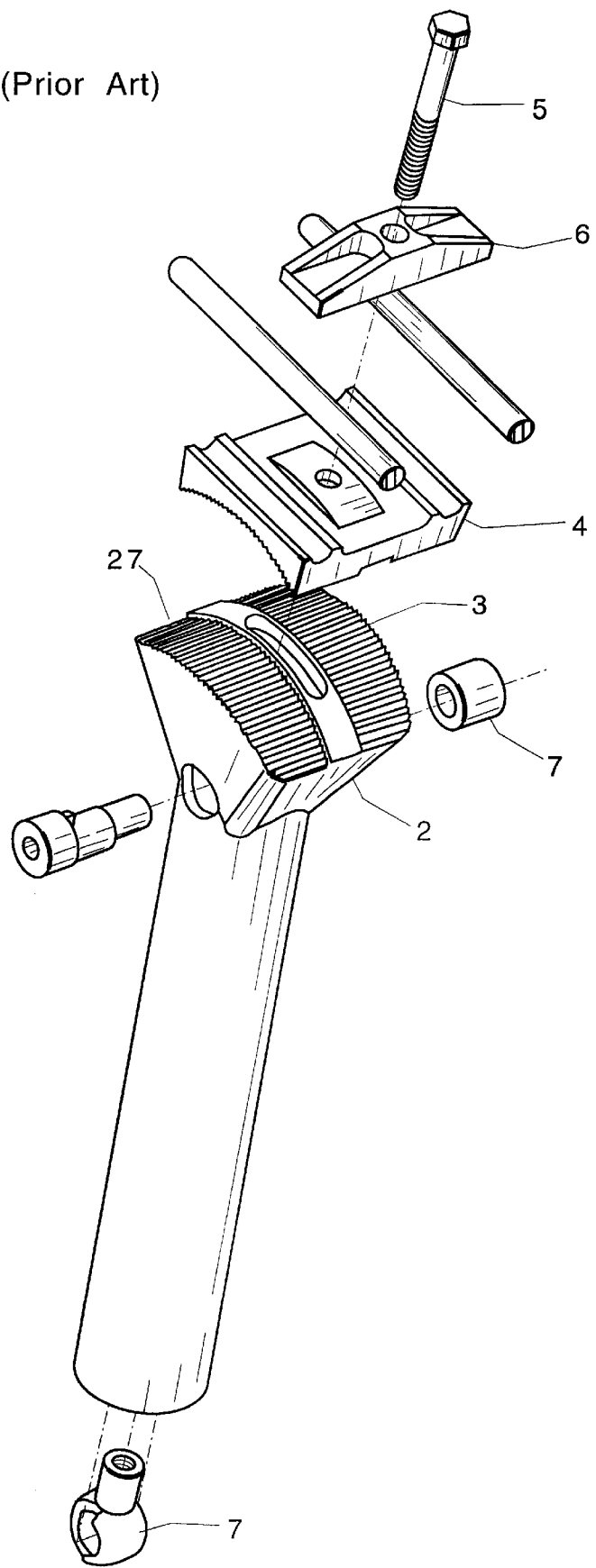
FIG. 1 illustrates the prior composite design.
Figure 2:
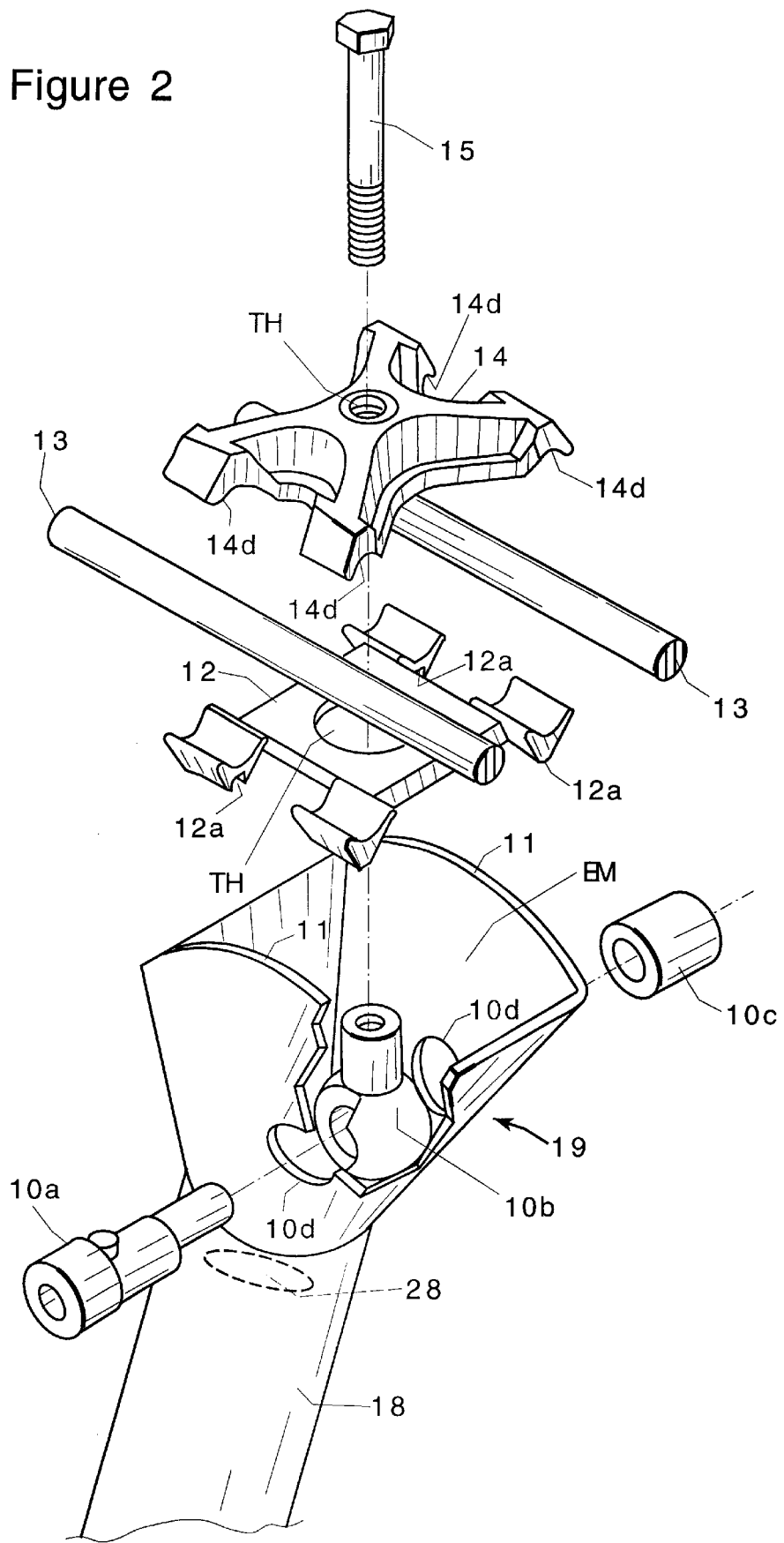
FIG. 2 illustrates embodiment 1 of the present invention.

Embodiment 1 of the bicycle seat post of the present invention is illustrated in FIG. 2. A tube 18 is formed from drawn, extruded or welded aluminum, steel or titanium. A flared head 19 is formed on the upper end of tube 18 by flaring or inside diameter spinning or pointing a cone-shaped enlarged mouth EM on tube 18, then crimping or forming this mouth into the approximately rectangular shape shown in FIG. 2 having fore and aft sidewalls. Alternately, a tube with an outside perimeter equal to the largest perimeter of head 19 could be outside diameter spun or pointed or rotary swaged down on its lower end to the outside diameter of tube 18. These are standard industrial processes which are fast and inexpensive. The inside and outside diameter spinning processes can be performed on a standard lathe with some fairly simple additional tooling consisting of specialized rollers.

Edges 11 can be cut with a vertical mill and rotary table wherein the milling cutter rotates in a stationary position and the tube end is rotated past it. For higher volume production a high speed shearing die would be used to shear and form the top edge shape.

A light weight water plug 28 seals the inside of the tube and prevents water from flowing down tube 18 and into the seat tube of the bicycle.

A hole 10*d* is drilled through head 19, normal to the axis of tube 18. Cam screw 10*a*, cam bearing nut 10*b* and cam bushing 10*c* are retained in hole 10*d*. Nut 10*b* engages bolt 15. When cam screw 10*a* is turned clockwise, it cinches bolt 15 down on clamp 14, saddle rails 13 and lower clamp 12. Lower clamp 12 has arcuate grooves 12*g* which rests on edges 11, which reacts the load from cam screw 10*a*. Saddle adjustment is achieved by loosening screw 10*a*, moving saddle and saddle rails 13 to desired pitch, then tightening screw 10*a*. Slots 12*a* on clamp 12 engage edge 11 to maintain alignment of saddle rails 13. Thus, load from rails 13 passes directly into head 19 without use of a cantilevered solid head. This simple difference accounts for most of the weight saving potential of this invention. Clamp 14 has four depressions 14*d* at its four corners shaped so as to engage and retain rail 13. At the center of clamp 14 is a threaded hole parallel to the axis of tube 18 which receives bolt 15. At the center of clamp 12 is a through hole TH which allows bolt 15 to pass to threaded engagement with nut 10*b*.

B. Embodiment 2

Figure 3:
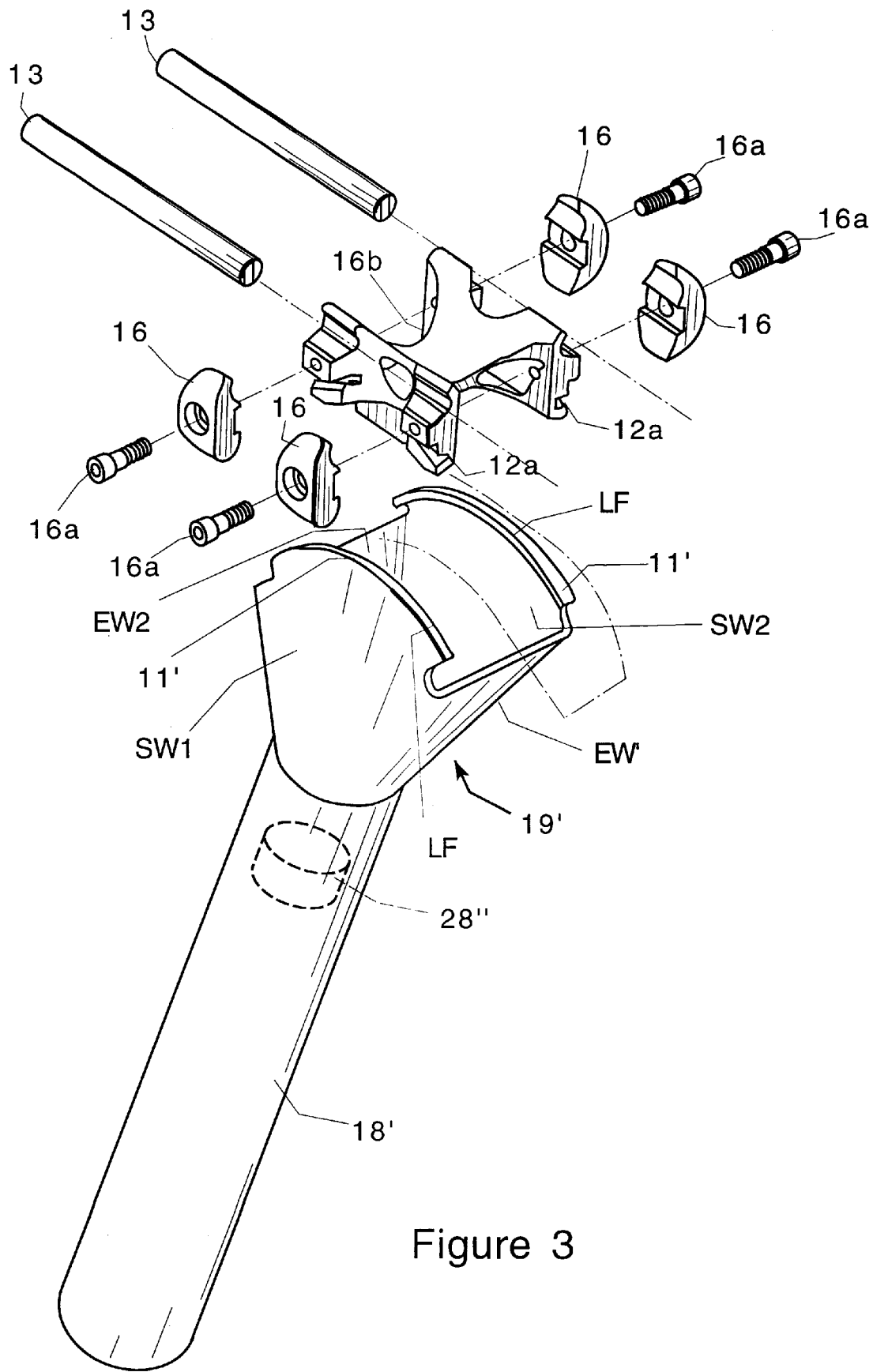
FIG. 3 illustrates embodiment 2 of the present invention.

Embodiment 2 of the bicycle seat post of the present invention is illustrated in FIG. 3. Tube 18', head 19', plug 28' and edge 11 are similar to embodiment 1.

Four individual seat clamps 16 retain saddle rails 13 to edge 11. In this embodiment, upper edge 11 may have a lip or flange LF which bends to either the inside or outside of head 19'. Alternatively the upper edge 11 may have formed folds or grooves along the edge. Clamps 16 operate independently to secure rails 13 to edge 11' so that load passes directly from rails 13 into head 19'. This allows a significant reduction in the mass of the clamp by reducing the distance between the bolt and the rail, which reduces stress in the clamp. Saddle adjustment is achieved by loosening seat adjustment screws 16*a*, moving saddle to desired pitch, then tightening screws 16*a*. Arcuate slots 12*a* on clamps 16 retain lip LF on edge 11 to maintain alignment of saddle rails 13. The end walls EW1 and EW2 are lower than the sidewalls SW1, SW2 to allow clamp member 16 to be fitted on lips or flanges LF.

Clamps 16 may be designed in various ways, a few examples are described:

In variation 1 edge 11 is formed into an angled flange at an upturned angle. Screw 16*a* cinches an inner clamp half 16*b* to an outer clamp half 16*c*, holding rail 13 and flange 17 between halves 16*b* and 16*c*. The head of screw 16*a* faces to the outside of head 9 in this variation.

In variation 2 edge 11 is formed into a radiused flange, bent to the outside of head 9. An outer frame 19*a* reacts load created by threading tapered screw 16*a'* into a upper clamp block and a lower clamp block. This load clamps rail 13 into a recess in one of the clamp blocks.

In variation 3 edge 11 is formed into a right-angle flange, bent to the outside of head 9. The flange is clamped by bolt 16*a* threaded through a brace 19*d*. Bolt 16*a* has a pad 16*b* and a recessed hex drive head similar to a common machine set screw. A recess in brace 19*d* and a recess in a pad 19*e* retains rail 13. A lip 19*f* on pad 19*e* keeps the assembly from slipping sideways off flange 20.

In variation 4 edge 11 is formed into an angled flange, bent to the outside of head 9. A cap holds the lower outer edge of flange 17 and the upper surface of rail 13. A bolt cinches a wedge against a rest, retaining rail 13.

Of course, other methods may be utilized to obtain the clamping surface, such as bonding in place a flanged or grooved assembly. This would be particularly advantageous for a tubular structure made or reinforced with Carbon fiber composite, for example. The composite does not survive high pressure clamping loads very well, but it does provide a high strength if bonded to a durable clamping means with an adequate surface area.

C. Embodiment 3

Figure 4:
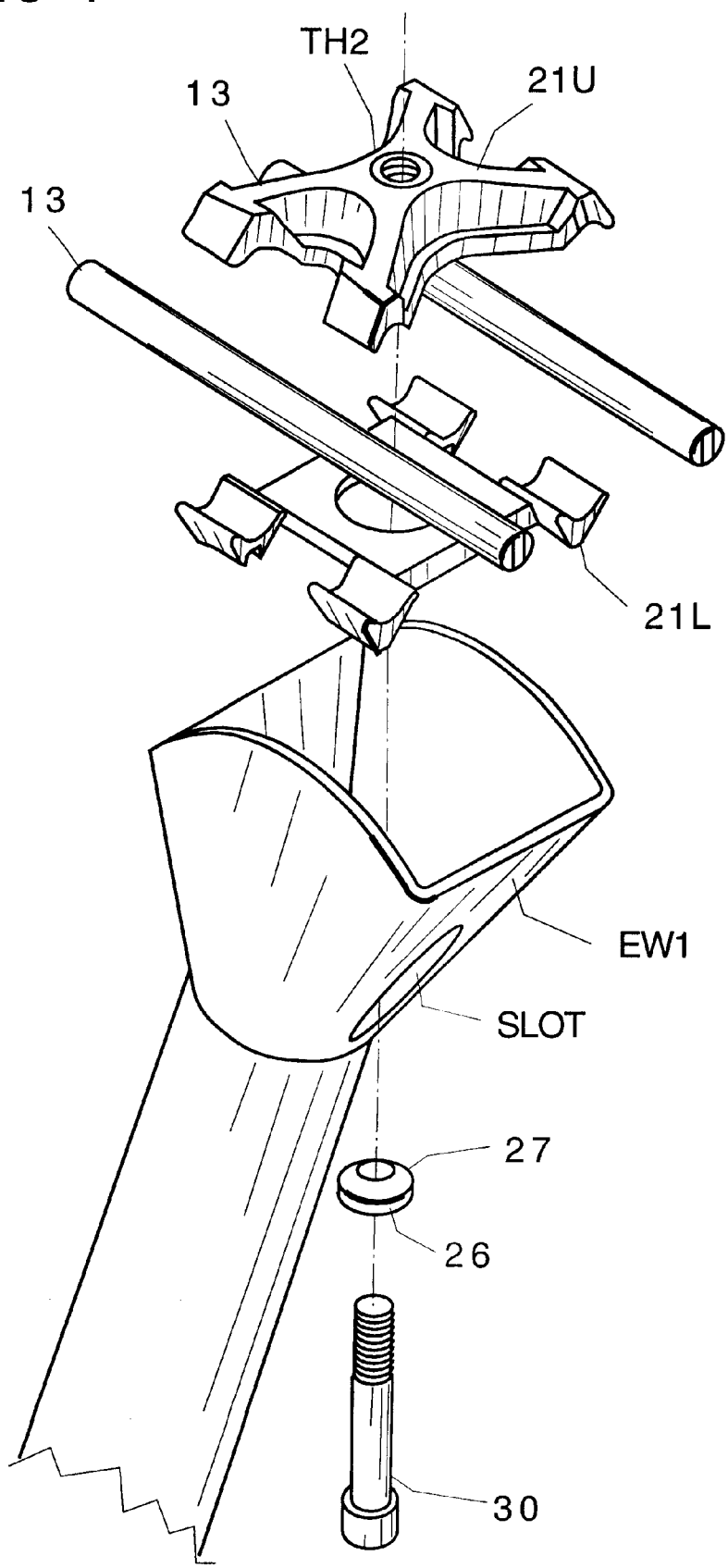
FIG. 4 illustrates embodiment 3 of the present invention.

Embodiment 3 of the bicycle seat post of the present invention is illustrated in FIG. 4. Tube 18, head 19, plug 28 and edge 11 are similar to embodiment 1.

Two individual seat cinches 21U and 21L retain saddle rails 13 to edge 11. In this embodiment, upper edge 11 may have a lip or flange (FIG. 3) which bends to either the inside or outside of head 19. Cinches 21L and 21U operate to secure rails 13 to edge 11 so that load passes directly from rails 13 into head 9. This allows a significant reduction in the mass of the clamping mechanism by reducing the distance between the bolt and the rail, which reduces stress in the clamp. Saddle adjustment is achieved by loosening bolt 30, moving saddle to desired pitch, then tightening bolt 30.

In this embodiment, bolt 30 comes up from below clamp members 21L and 21U via slot SL in end wall EW1 to secure to the threaded hole TH2 in clamp 21U. Bolt 30 seats in dimple 26 on washer 27.

Figure 5:
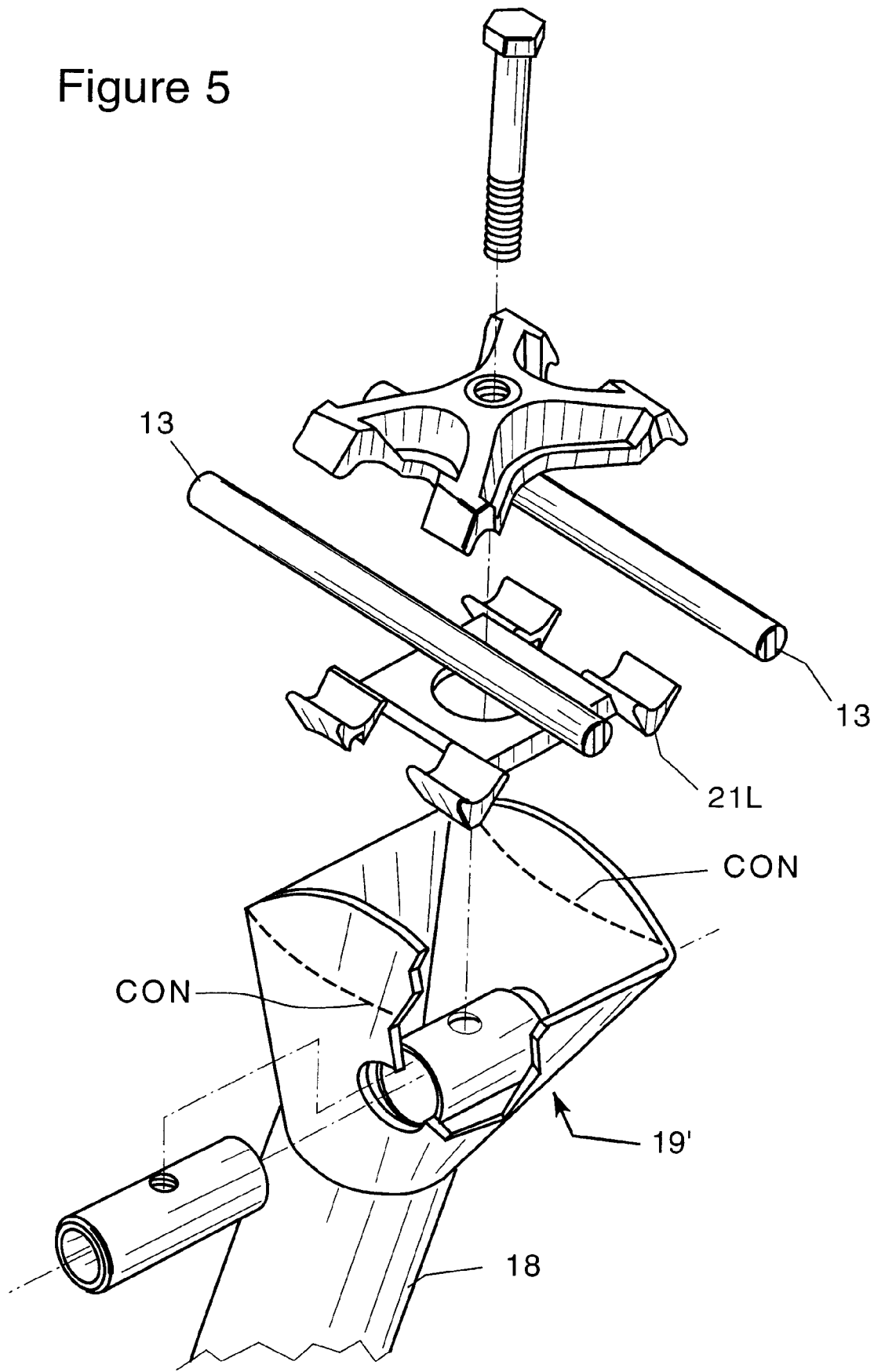
FIG. 5 illustrates embodiment 4 of the present invention.

EDGE SHAPE FOR ALL EMBODIMENTS: The top edge shape is shown in most illustrations as preferably a convex arc, but other shapes could be used to provide the necessary adjustment of the saddle angle and fore aft position of the saddle with respect to the post axis. The arc or curve could also be concave as indicated in dotted lines CON of FIG. 5. The clamping edges could be two straight lines at an angle to each other or a differently shaped curve such that changing the clamping position along the curves also changes the saddle angle. The curved edge can be shaped and angled with respect to the post axis to position the seat in a traditional rear offset position, centered, or forward mounted position.

This invention enables the production of a light weight, high strength seat post for bicycle racing.

This design is:

1) Lightweight, as seat loads are taken directly in line with the tube wall. There is little or no offset or cantilever force as in conventional designs.

2) Strong, the hollow tubular structure is very efficient and durable. The clamping means are lightweight and compact, but robust.

3) Simple and inexpensive to manufacture, as the typical massive set post head is eliminated, along with a bonding, welding or joining process.

4) Reduces the number of components needed.

5) Simplifies adjustment and setup.

Thus the reader will see that the bicycle seat post of this invention provides a competitive bicycle rider with a lightweight and strong means of securing his seat to his bicycle frame. One of the unique features of this invention is the use of a light weight open head to secure the rail clamps. All previous designs used some sort of closed or heavy head design.

While the above description contains many specific details, these should not be construed as limitations on the scope of the invention, but rather as an exemplification of one preferred embodiment thereof. Other variations are possible. For example, the tube and head could be internally reinforced with composite material, or the details of the clamping mechanism design could be different.

The invention incorporates one or more of the following features:

1. Seat post formed by spinning process, with tubular enlarged and shaped head.

2. Seat post formed by rotary swaging process.

3. Seat post formed by flaring process.

4. Seat post with larger circumference open mouth at top, except water sealing plug.

5. Seat post with clamps resting on or attached directly to top edge of tube.

6. Seat Post with 2 or 4 clamps gripping top edge of tube.

7. Tube having 2 parallel arcs, curves or angled lines at upper edge, adjacent the saddle rails (concave or convex) allowing angle adjustment.

8. Seat post using concave edge in order to position seat more to the rear of the bicycle.

9. Seat post using offset curve, where center of arc would be behind the axis of the post in order to position seat more to the rear of the bicycle.

10. Seat post using edge clamps of different heights, in order to position seat more toward the rear of the bicycle.

While various preferred embodiments of the invention have been shown and described, it will be appreciated that numerous other adaptations and modifications of the invention will be readily apparent to those skilled in the art.

A. Reference Numerals in Drawings 1 tube
2 head
3 upper surface
4 pillow washer
5 bolt
6 yoke
6a saddle rails
7 cam assembly
8 tube
9 flared head
10a cam screw
10b cam bearing nut
10c cam bushing
10d cam hole
11 upper edge of head
12 lower rail clamp
13 saddle rail
14 upper rail clamp
15 bolt
16 individual seat clamps
16a seat adjustment screw
16b inner clamp half
16c outer clamp half
17 angled flange
18 radiused flange
19a outer frame
19b upper block
19c lower block
20 right angle flange
21 seat cinches
22 strong back
23 grip
24 recessed flange
25 plate
26 dimple
27 washer
28 water plug B. Materials of Manufacture In the preferred embodiment, the materials used to manufacture the components of the seat post are as follows:

| | | |
|---|---|---|
| 18 | tube | extruded Aluminum tube |
| 12 | lower clamp | forged or extruded aluminum |
| 14 | upper clamp | forged or extruded aluminum |
| 15 | bolt | steel |
| 10a through 10c | cam | steel |

What is claimed is:

1. A lightweight, high strength bicycle seat post for a bicycle seat having left and right saddle rails, and a fore and aft direction to a bicycle frame having a seat tube, comprising, a hollow metal tubular member having a seat tube portion for reception in and securement to the seat tube of said bicycle frame, and an integral head portion comprised of at least four planar walls diverging in an upward direction to form an open space, a pair of said walls being sidewalls oriented in a fore and aft direction relative to the fore and aft direction of said bicycle seat and have fore and aft ends, a pair of end walls which are transverse to the fore and aft direction of said pair of sidewalls and connect the fore and aft ends of said pair of sidewalls, said pair of sidewalls having arcuate load reacting edges which define a seat angle adjustment path, and clamp means for securing said bicycle seat to said load reacting edges so that seat loads are transferred directly to said load reacting edges at any seat angle.

2. The bicycle seat post defined in claim 1 wherein said pair of end walls are shorter than and do not extend to the height of said sidewalls.

3. The bicycle seat post defined in claim 1 wherein said bicycle seat has a pair of securement rails, and said clamp means engages each rail of said pair of rails in at least two spaced points.

4. The bicycle seat post defined in one of claims 1, 2, or 3 wherein each said arcuate load reacting edge includes a lip which is normal to said load reacting edge.

* * * * *